(12) United States Patent
Sanchez

(10) Patent No.: US 8,733,830 B2
(45) Date of Patent: May 27, 2014

(54) HEADREST HAT HOOK RETRACTABLE SIDE HANGER

(76) Inventor: Roy C Sanchez, Las Vegas, NV (US)

( * ) Notice: Subject to any disclaimer, the term of this patent is extended or adjusted under 35 U.S.C. 154(b) by 150 days.

(21) Appl. No.: 13/403,649

(22) Filed: Feb. 23, 2012

(65) Prior Publication Data

US 2013/0221712 A1    Aug. 29, 2013

(51) Int. Cl.
*A47C 7/62* (2006.01)
*A47C 7/36* (2006.01)

(52) U.S. Cl.
USPC .................. 297/188.03; 297/188.21; 297/391

(58) Field of Classification Search
USPC ................. 297/188.03, 188.2, 188.4, 188.05, 297/188.06, 391
See application file for complete search history.

(56) References Cited

U.S. PATENT DOCUMENTS

| 2,390,257 A | * | 12/1945 | Jahn | 248/294.1 |
| 5,558,383 A | * | 9/1996 | Lancellotti | 294/143 |
| 5,791,614 A | * | 8/1998 | Sims | 248/230.7 |
| 6,095,469 A | * | 8/2000 | Von Alman | 248/304 |
| 6,443,523 B1 | * | 9/2002 | Reitze | 297/188.03 |
| 6,994,236 B2 | * | 2/2006 | Hsu | 224/275 |
| 7,669,821 B2 | * | 3/2010 | Martin | 248/294.1 |
| 7,784,864 B2 | * | 8/2010 | Feder | 297/188.06 |
| 8,079,446 B2 | * | 12/2011 | Nemoto | 185/40 H |
| 2003/0121943 A1 | * | 7/2003 | Chou | 224/275 |
| 2006/0261229 A1 | * | 11/2006 | Hirota | 248/304 |

FOREIGN PATENT DOCUMENTS

JP    59-116242    *    8/1984

* cited by examiner

*Primary Examiner* — Sarah B McPartlin

(57) ABSTRACT

The headrest hat hook retractable side hanger allows the driver and passenger to hang their hat and coat on the side of the headrest seat inside a vehicle. An automobile headrest seat comprising of a headrest retractable hat hook hanger built into the right side and left side of the headrest that retracts inside the headrest for storage and can extend out the double hat hook from the both sides of the headrest to hang hats, caps, and coats.

1 Claim, 3 Drawing Sheets

HEADREST HAT HOOK RETRACTABLE SIDE HANGER

FIELD OF THE INVENTION

Headrest hanger for inside a vehicle in particularly a headrest hanger that is retractable inside the headrest seat design to hang hats and caps.

BACKGROUND OF THE INVENTION

There are coat hangers and utility hooks for inside the automobile. Some coat hangers connect to the headrest rail and hang from the backside of car seat. Some vehicle hangers are big wide hangers use mainly for coats and some have utility hooks to hang grocery bags. There is a need to have a hat hanger for headrest mounted on the right side and left side of the headrest for easy reach to hang hats and caps. The embodiment will describe the headrest retractable hat hanger function and design.

SUMMARY OF THE INVENTION

A headrest for a vehicle seat comprising of a hanger apparatus that is retractable built inside the right side and left side of the headrest seat that retracts and extends out to hang hats and caps inside the vehicle. The advantage of the present invention allows the hanger apparatus to retract inside the headrest for storage and easily extend out to hang hats. The headrest hanger apparatus can be installed into the right side and left side of any headrest which allows the driver or passenger to extend out the retractable hook from the right side and left side for usage. Another feature is the retractable hook can adjust to pivot the double hook to a vertical position even if the headrest is at any angle or the seat is reclined. The headrest hanger apparatus allows the driver and passenger to hang their hats and coats on the side of the headrest above the shoulder of the seat where it is convenient and easy to reach.

DESCRIPTION OF THE PREFERRED EMBODIMENT

The preferred embodiment is a headrest hanger apparatus comprising of a double hook that retracts inside the right side and left side of a headrest seat for storage and can extend out to hang hats and coats inside the vehicle.

Figure 1:
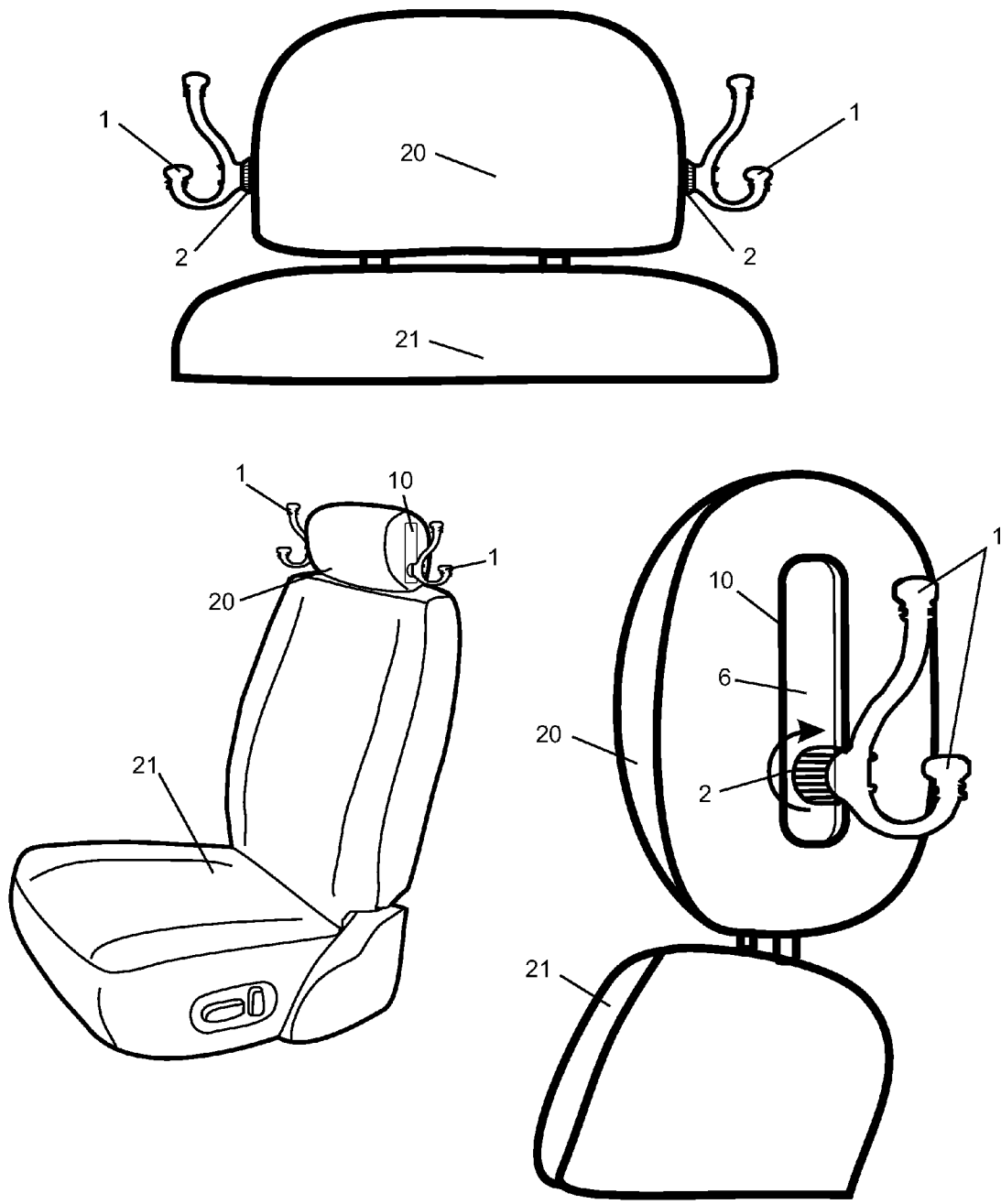
FIG. 1 is a front perspective view of the headrest hanger apparatus for a vehicle seat.

FIG. 1 illustrates a headrest hanger apparatus for a vehicle seat comprising of a double hook 1 mounted on both the right side and left side of the headrest 20 that allow passengers to hang their hat and cap on the side of the headrest 20 seat 21. The double hook 1 has an elongated top hook and a curve hook at the bottom that can slide out of the housing inside the right side and left side of the headrest 20. The double hook 1 has a pivot fastener 2 that is attach to a back plate 6 inside the housing 10 of the headrest 20. The components for the headrest hanger apparatus is house inside the automobile headrest 20 where it can slide out for use and retracts inside the headrest 20 for storage.

Figure 2:
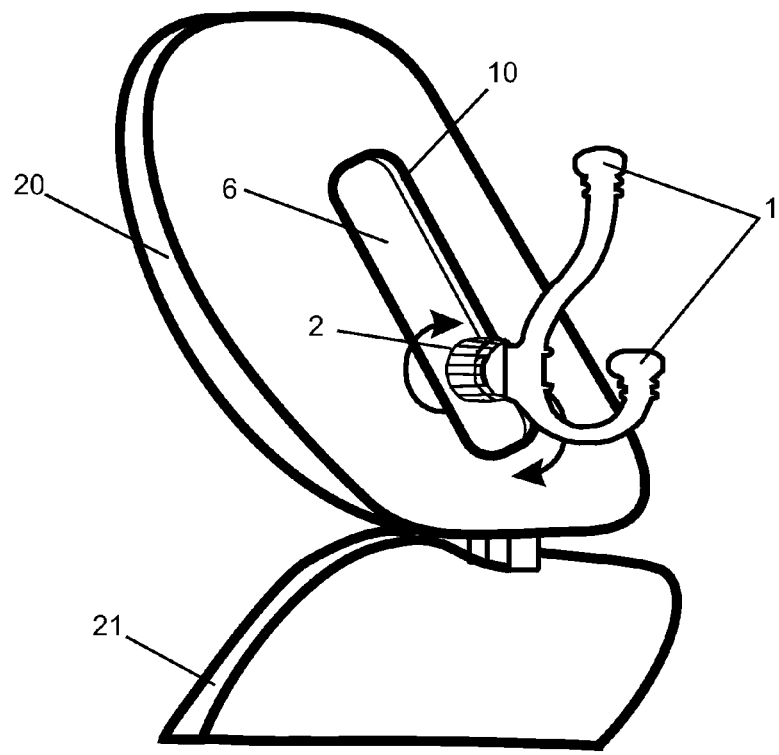
FIG. 2 is a side perspective view of the headrest hanger apparatus.

FIG. 2 illustrates a side view of the headrest hanger apparatus with a slanted headrest 20 leaning at an angle. The double hook 1 has a pivot fastener 2 that can rotate and adjust so the double hook 1 can be at a vertical position perpendicular to the floor of the vehicle even if the headrest 20 is at a diagonal angle or the seat 21 is reclined back.

Figure 3:
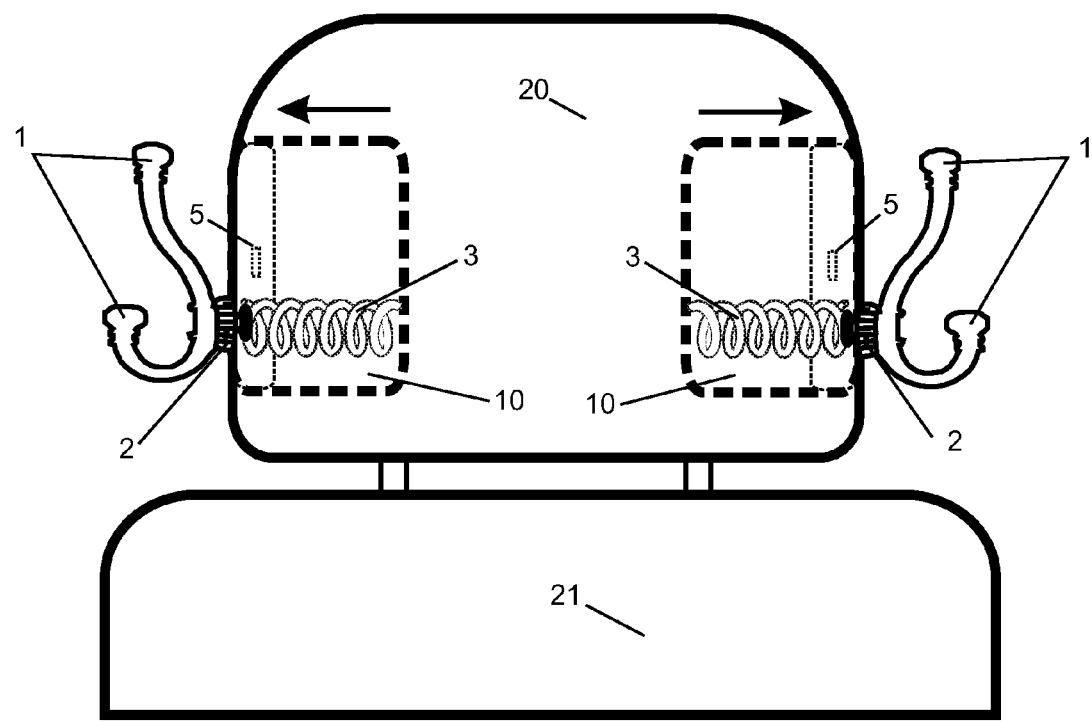
FIG. 3 is a slice perspective view of the headrest hanger apparatus.

FIG. 3 illustrates a slice view of the headrest hanger apparatus with the double hook 1 extended out from the right side and left side displaying the spring 3 pushing out the double hook 1 from its housing 10 compartment. The headrest hanger apparatus has a latch mechanism that operates by pressing the lid 5 to release latch so the spring 3 pushes the double hook 1 out of its housing 10 compartment.

Figure 4:
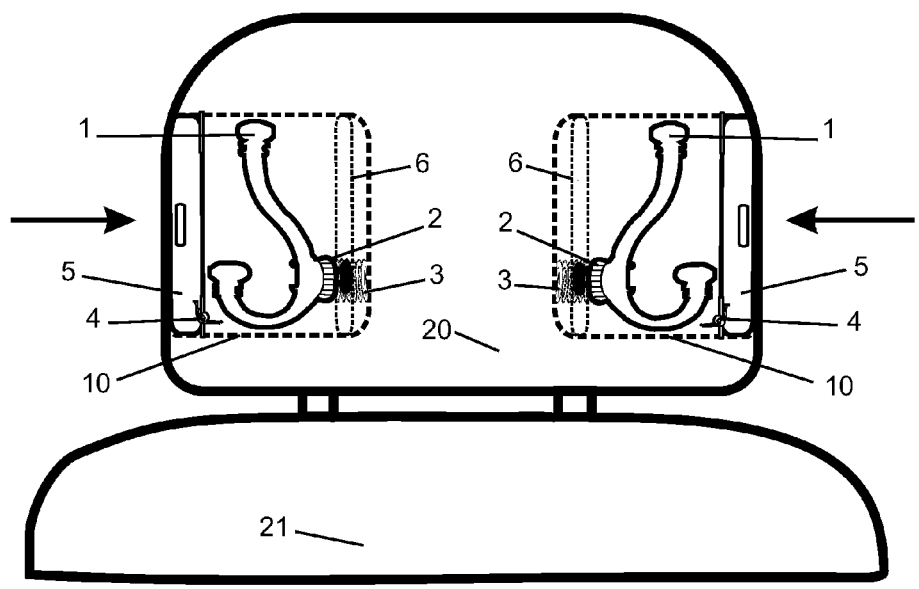
FIG. 4 is a cut out perspective view of the headrest hanger apparatus retracted inside the housing of the headrest.

FIG. 4 illustrates a cut out view of the headrest 20 where the headrest hanger apparatus and the double hook 1 is retracted inside its housing 10 and stored inside the headrest 20. The springs 3 are compressed behind the back plate 6 of the double hook 1 and the lid 5 with a torsion spring 4 on the hinge cover up the double hook 1 inside the housing 10 compartment. To operate push the double hook 1 inside the housing 10 compartment until the latch mechanism locks into place and compresses the spring 3 behind the back plate 6 and closing the lid 5 for the housing.

Figure 5:
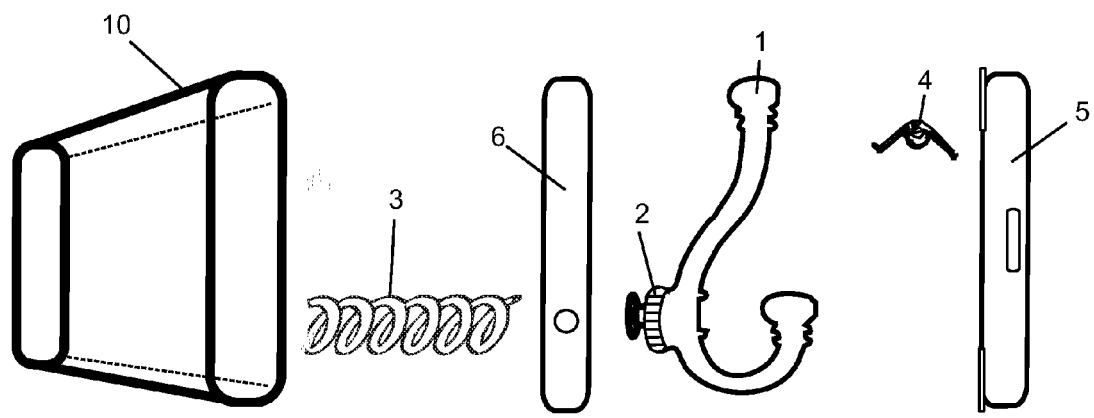
FIG. 5 is an exploded view of the components that make up the headrest hanger apparatus.

FIG. 5 illustrate an exploding view of the headrest hanger apparatus and its parts. The double hook 1 has an elongated top hook and a curve hook on the bottom for hanging hats and caps. The double hook 1 has pivot fastener 2 that can rotate to any angle keeping the double hook 1 at a vertical perpendicular position. The fastener 2 attaches to a back plate 6 that acts as the support mount. The spring 3 can compress and expand to push the double hook 1 out of the housing 10 compartment. The lid 5 cover has a torsion spring 4 that swings opens and closes the lid 5 cover.

The embodiment of the headrest hanger apparatus can be adapted to any variations all housed inside the headrest seat of a vehicle allowing the headrest hanger apparatus to slide out on the right side and left of the headrest to hang hats and retract inside the headrest for storage.

What is claimed:

1. A headrest hanger apparatus comprising: a headrest; at least one retractable hook; at least one housing having a housing case; and springs, wherein the retractable hook and springs are positioned inside the housing case the retractable hook is extendable to a position outside of the housing case and at least one housing is mounted in each of a right side and a left side of said headrest, wherein said retractable hook is attached to a pivot fastener allowing the retractable hook to rotate to a perpendicular position with respect to a floor of a vehicle in which the headrest hanger apparatus is mounted independent of an angle at which the headrest is deployed.

* * * * *